Jan. 6, 1970   J. R. HULME ET AL   3,488,030
ELECTRICAL MOTOR OPERATED VALVE
Filed Aug. 17, 1966
FIG.1
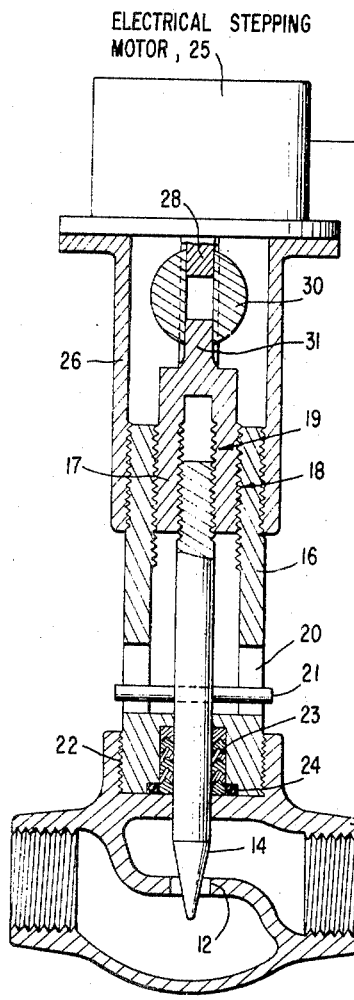
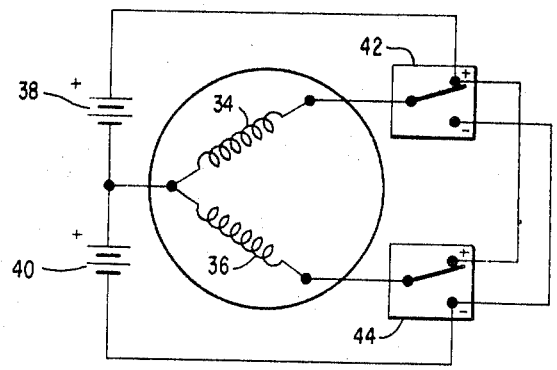
FIG.2
FIG.3
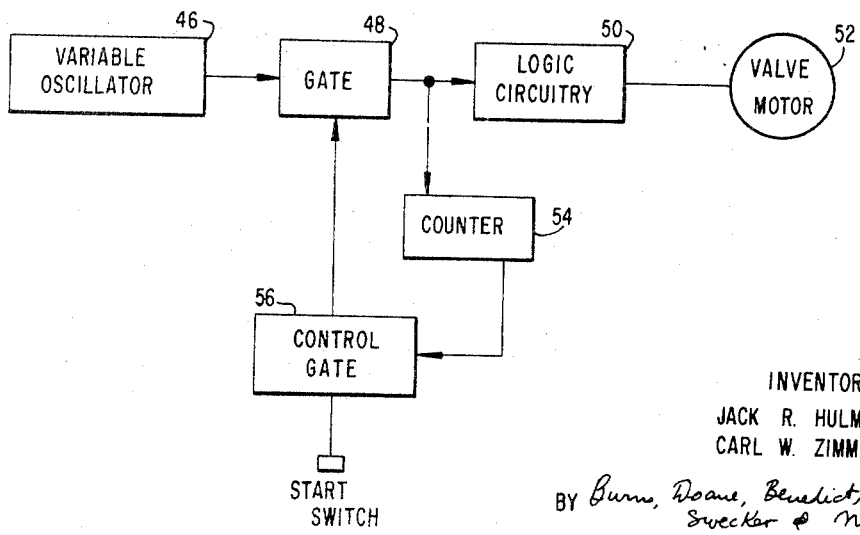
INVENTORS
JACK R. HULME
CARL W. ZIMMERMAN
BY Burns, Doane, Benedict,
Swecker & Mathis
ATTORNEYS United States Patent Office 3,488,030
Patented Jan. 6, 1970

3,488,030
ELECTRICAL MOTOR OPERATED VALVE
Jack R. Hulme and Carl W. Zimmerman, Duncan, Okla., assignors to Halliburton Company, Duncan, Okla., a corporation of Delaware
Filed Aug. 17, 1966, Ser. No. 572,974
Int. Cl. F16k 31/04, 1/08
U.S. Cl. 251—134          2 Claims

ABSTRACT OF THE DISCLOSURE

A motor operated valve comprising an electric stepping motor which rotates a fixed increment for each cyclic signal received from an electric energizing means to accurately control the position of a valve. The motor is connected to the valve through an oppositely threaded gearing member is provide differential movement of the valve in response to rotation of the motor.

---

This invention relates to motor operated valves and more particularly to valves operated by an electrical stepping motor.

Electrical motors have been found to be efficient power sources for operating valve members to control the flow of material through a valve. Such electrical motor operated valves are particularly useful in oil well environments, where it is often desirable to accurately meter the flow of liquids or gases, or to automatically adjust fluid flow rates and pressures. Other typical applications of electrical motor operated valves are the control or metering of the flow of powdered solid materials suspended in gasses as in air delivery systems. Generally, the electrical motors heretofore used to operate valve members have been conventional types of reversible electric motors.

However, electrically operated motor valves heretofore developed have not been completely satisfactory with respect to very accurate valving and have generally not provided an accurate means to provide a predetermined valve orifice in response to signals from a remote electrical control system. Further, the electrical motor operated valves heretofore developed have generally required complex limit switch arrangements in order to prevent damage to the motor upon reaching the maximum limit of travel of the valve members.

Accordingly, a general object of the present invention is the provision of an electrically operated motor valve which substantially minimizes or eliminates the disadvantages of motor operated valves heretofore available.

A more specific object of the present invention is the provision of a valve operated by an electrical stepping motor.

A further object of the present invention is the provision of an electrical motor operated valve which does not require limit switches or other similar position responsive safety provisions.

Another object is the provision of an electrical motor operated valve which may be positioned to form an accurate predetermined valve orifice in response to a remote electrical control signal.

Yet another object of the present invention is the provision of an electrically operated motor valve which may be adjusted at a very slow rate to provide extremely accurate fluid material metering.

In order to achieve these and other objects that will be apparent hereinafter, the instant invention provides a valve member adapted to control the flow of material through a valve, a gearing member for moving the valve member between opened and closed positions, and an electrical stepping motor of the type which can be stalled without damage for incrementally driving the gear member to selectively position the valve member without the necessity of limit switches and the like.

The invention and its many advantages may be further understood by reference to the following detailed description illustrated in the accompanying drawings, in which:

FIGURE 1 is a view partially in cross section of a double-threaded valve constructed and driven in accordance with the present invention;

FIGURE 2 is a schematic drawing of an electrical stepping motor suitable for use in the present invention; and FIGURE 3 is a block diagram of a source of electrical energizing signals for the present invention.

Referring now to the drawings, FIGURE 1 illustrates one embodiment of the present electrical motor operated valve. A conventional valve chamber 10 is shown which includes a valve seat 12 for receiving the end of an elongated valve member, or valve stem, 14 in order to control the flow of material through the valve chamber. A housing 16 encloses the upper portion of the valve member 14. A gearing member 17 is connected to the housing 16 by means of a first threaded connection 18. Gearing member 17 is connected to valve member 14 by a second threaded connection 19. The first and second threaded connections have opposite thread directions to provide differential motion between the gearing member 17 and the valve member 14. Additionally, an elongated slot 20 is defined in the walls of the housing 16 in order to receive the ends of an outwardly projecting pin 21 which is rigidly connected to the valve member 14.

The lower end of the housing 16 is conventionally received by a suitable threaded opening 22 in the upper portion of the valve chamber 10. A packing gasket 23 and O-ring 24 are provided at the lower end of the housing 16 to prevent the escape of fluid from the valve chamber 10 into the interior of housing 16. Packing 23 allows rotational as well as longitudinal axial movement of the valve member 14.

A suitable electrical stepping motor 25, to be later described in greater detail, is rigidly connected to housing 16 by means of a cylindrical support body 26. The output shaft 28 of the electrical stepping motor 25 is received by a splined coupling 30, and the upper end 31 of gearing member 17 is also received by the splined coupling 30. Rotation of the output shaft 28 thus causes rotation of the gearing member 17 and the valve member 14. The splined coupling 30 also allows axial movement of gearing member 17 caused by rotation of gearing member 17 in the threaded connection 18.

The electrical stepping motor 25 may be energized by a suitable remote source 32 of electrical energization signals, which may comprise an output from an automatic control flowmeter or pressure sensor system. Alternatively, the remote source 32 may comprise circuitry which may be manually set to generate a predetermined number of energizing pulses, as will later be described with reference to FIGURE 3. Motor 25 is of the type which rotates a fixed incremental amount in response to each input pulse or cycle of an alternating current source, and therefore the valve member 14 may be remotely positioned to provide a selected orifice by applying a selected number of pulses or cycles of an alternating signal to the motor 25.

In operation, when the electrical stepping motor 25 is energized, the output shaft 28 causes incremental rotation of the gearing member 17 and the valve member 14 through the flexible splined coupling 30. The first helically threaded connection 18 causes axial movement of the member 17 relative to both the housing 16 and the splined connection 30.

Additionally, rotation of the gearing member 17 causes the pin 21 to abut the walls of the slotted portion 20 of the housing 16 to restrain rotation of the valve member 14. The second threaded connection 19 thus causes relative axial movement between the valve member 14 and the gearing member 17. As the first and second threaded connections have opposite threaded directions, a differential axial movement exists between the gearing member 17 and the valve member 14. Very accurate positioning of the valve member 14 results from the incremental rotation by the electrical stepping motor 25. As the pin 21 restrains rotational movement of the valve member 14, the valve member 14 moves only axially through the packing gasket or bearing 23.

Electrical stepping motor 25 is of the type which may be stalled without damage or overheating of the motor windings. Therefore, the present electrical motor operated valve may be fully closed so that valve member 14 abuts valve seat 12 without damage to the electrical stepping motor 25. Additionally, the valve member 14 may be axially moved upwardly to its fully opened position without damage to the electrical stepping motor 25, and without the provision of position responsive safety provisions, such as limit switches.

It will be understood that various types of valve members may be utilized in the practice of the present invention. A butterfly type valve member for controlling the flow of powdered solid materials suspended in gases, as in air delivery systems, is an example. The incremental stepping operation provided by an electrical stepping motor to such a butterfly type valve provides very accurate metering or control of the flow of powdered solid materials, in addition to eliminating the necessity of complicated limit switch systems previously often required by electrical motor valves.

FIGURE 2 is a schematic diagram of an electrical stepping motor suitable for use in the present invention and comprising a permanent magnet rotor and two field windings 34 and 36. D.C. voltage sources 38 and 40 are connected across the windings 34 and 36 through switches 42 and 44. While the motor may be used as a conventional synchronous permanent magnet type motor having a relatively slow basic shaft speed, with the provision of switches 42 and 44, the motor may be selectively energized to provide a stepped rotation.

Each of the switches 42 and 44 has two operating positions and the two switches together have four possible switching combinations. For each one of the four switching combinations, the windings 34 and 36 are differently energized by the voltage sources 38 and 40. By providing means to sequentially switch switches 42 and 44 between their four switching combinations, the rotor will advance in the selected direction in predetermined increments of rotation. In the present invention, circuitry may be provided to sequentially shift the position of switches 42 and 44 in response to pulses or an alternating signal.

Such stepping motors are capable of very accurate stepping rotation and are able to be very quickly reversed in rotational direction. By applying a selected number of pulses or alternating cycles to the stepping motor valve of the present invention, the valve member may be moved to a predetermined position from a start position. The present invention may thus be utilized to remotely vary a metering stem in a choke valve to a selected valve orifice.

In addition to the extremely accurate valving possible with the present invention, the utilization of a stepping motor is particularly advantageous in that the motor is not damaged by stalling. Such stepping motor operated valves require no limit switches or other valve member position responsive safety measures to turn off the motor before the valve member reaches a fully on or off position and damages the motor.

FIGURE 3 is a block diagram of a suitable remote source for providing a predetermined number of energizing pulses to the present stepping motor operated valve. The remote source comprises an adjustable frequency oscillator 46 having an output connected through a gate 48 to logic circuitry 50 and stepping motor operated valve 52. A decade counter 54 is connected between the output of gate 48 and the control gate 56. Counter 54 includes a control panel in order to allow manual selection of the desired number of pulses to be supplied to the stepping motor operated valve 52. Control gate 56 is connected to gate 48 in order to control the passage of the output of oscillator 46. A suitable start switch is provided for control gate 56.

In operation, the desired number of pulses to be supplied to the stepping motor operated valve 52 is manually preset on the control panel of counter 54. Closure of the start switch of the control gate 56 then causes the gate 48 to pass the alternating current signals from oscillator 46 to logic circuitry 50 and counter 54. Logic circuitry 50 converts the signals into the correct switching sequence required to advance the stepping motor by operation of switches 42 and 44 of FIGURE 2. When the preset number of signals from oscillator 46 has been counted by counter 54, the control gate 56 turns gate 48 off and the stepping motor operated valve 52 is stopped. The frequency of the oscillator 46 may be varied in order to vary the stepping speed of the stepping motor.

It will thus be seen that the present invention provides an accurate motor operated valve which does not require limit switches. The present valve may be automatically positioned in accordance with the output of a flow rate and pressure sensitive system, or the valve may be remotely driven to a desired position by means of a manually set pulse supply circuit.

We claim:
1. Motor operated valve apparatus comprising:
   an elongated valve stem;
   a pin carried by said stem and extending laterally therefrom;
   gearing means for moving said valve stem between open and closed positions;
   housing means supporting said gearing means and having side wall portions defining an elongated slot for receiving said pin;
   said gearing means having a first threaded connection with said housing means and a second threaded connection with one end of said valve stem whereby rotation of said gearing means effects relative axial movement between said gearing means and said housing means, and whereby abutment of said pin with said side wall portions effects axial relative movement between said gearing means and said valve stem;
   electrical energizing means for providing a predetermined number of cyclic electrical signals including:
      oscillator means for supplying electrical cyclic signals, counting means connected to said oscillator means for counting the number of electrical cyclic signals supplied therefrom, said counting means including means for manually selecting a desired number of electrical cyclic signals, and gate means connected between said oscillator means and said counter means and controlled by said counter means for inhibiting the supplying of electrical cyclic signals when said counter means has counted said manually selected number of electrical cyclic signals;
   a reversible electrical stepping motor electrically connected to receive electrical signals from said elec- trical energizing means, said stepping motor being of the type which may be stalled without damage in order to move said valve member to a fully open or fully closed position without the necessity of position responsive safety provisions, said electrical stepping motor including a permanent magnet rotor, two field windings, and means responsive to each of said cyclic signals from said electrical energizing means to sequentially energize said field windings for incremental rotation of said rotor; and splined coupling means connecting said stepping motor and said gearing means for effecting rotation of said gearing means upon the incremental rotation of said stepping motor while allowing axial movement therebetween.

2. The apparatus of claim 1 wherein said first and second threaded connections have opposite thread directions to cause accurate differential relative movement between said gearing means and said valve stem.

References Cited

UNITED STATES PATENTS

| | | | |
|---|---|---|---|
| 1,519,675 | 12/1924 | Ford | 310—49 X |
| 2,059,151 | 10/1936 | Smith | 137—101.19 |
| 2,298,621 | 10/1942 | Holland-Letz | 310—49 X |
| 2,870,387 | 1/1959 | Brand et al. | 137—487.5 X |
| 3,158,163 | 11/1964 | Claudy | 137—487.5 X |
| 3,217,192 | 11/1965 | Feightner | 310—49 |
| 3,219,046 | 11/1965 | Waugh | 137—487.5 X |
| 1,294,491 | 2/1919 | Lavigne | 251—265 |
| 1,642,412 | 9/1927 | Farnsworth | 251—265 |
| 2,470,470 | 5/1949 | Carbon | 251—133 |
| 2,924,105 | 2/1960 | Graham | 251—133 |
| 2,966,170 | 12/1960 | Raulins | 251—265 |

WALTER A. SCHEEL, Primary Examiner

LEON G. MACHLIN, Assistant Examiner